Sept. 1, 1964            E. KNAUSS            3,146,597
HYDRAULIC BRAKE SYSTEM
Filed July 1, 1963            3 Sheets-Sheet 1
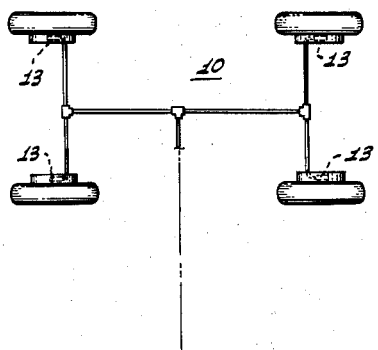
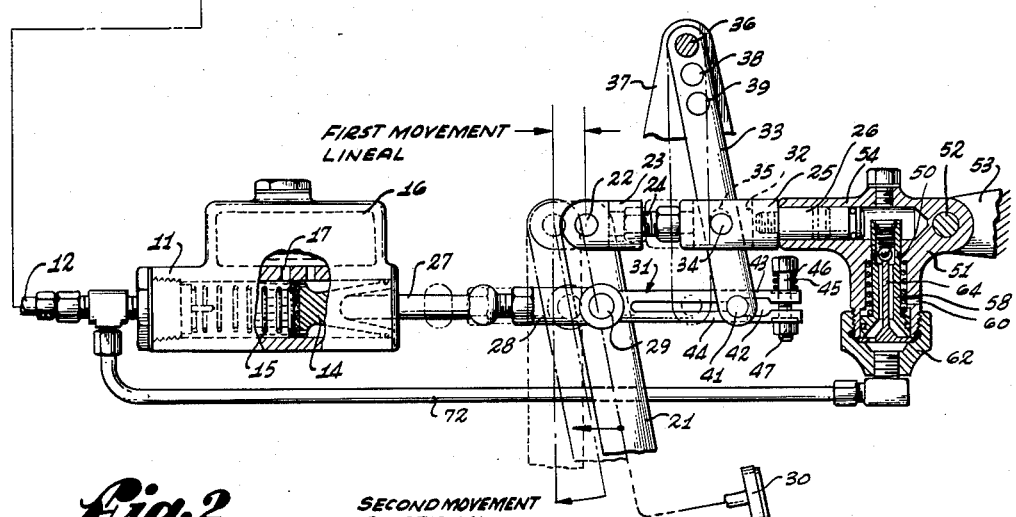
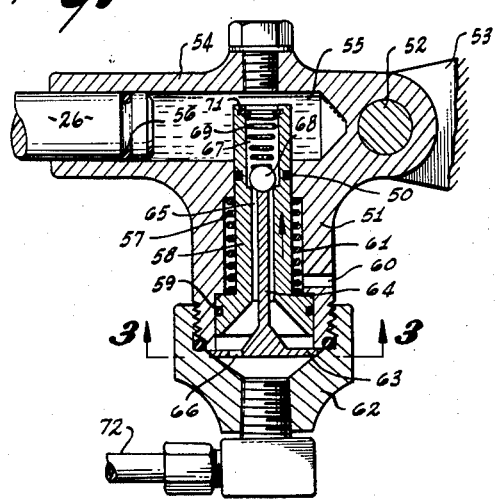
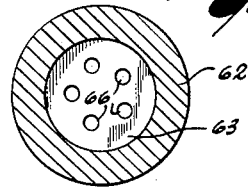
INVENTOR.
EDWARD KNAUSS
BY Zylwider, Patton, Rieber
Lee, and Utecht
ATTORNEYS

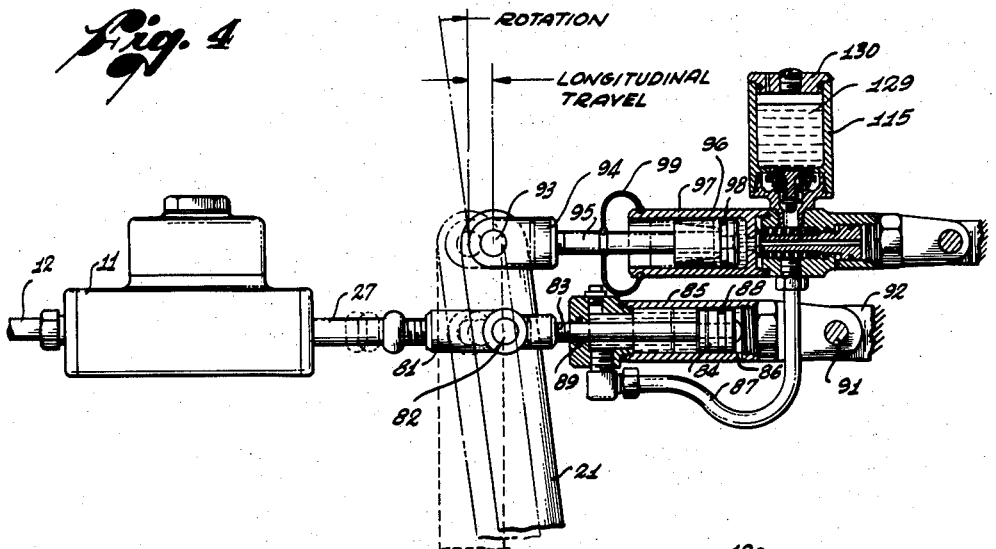

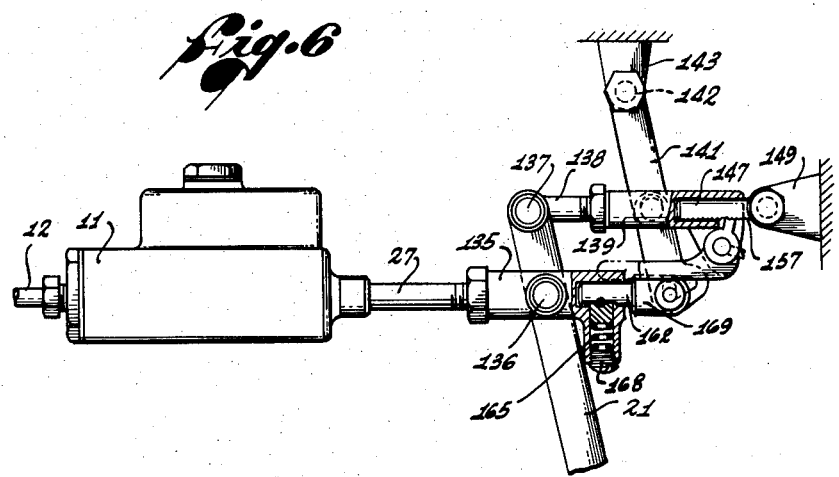
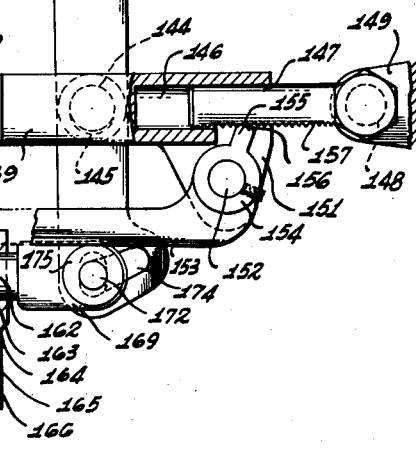
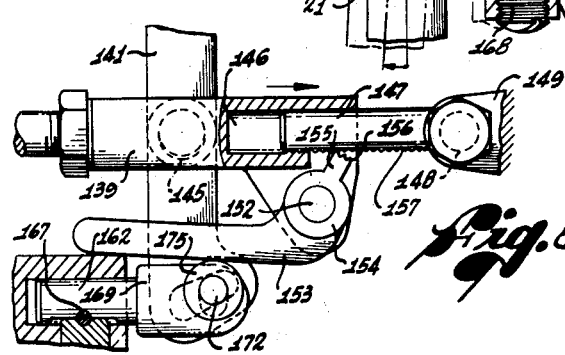
INVENTOR.
EDWARD KNAUSS
ATTORNEYS United States Patent Office 3,146,597
Patented Sept. 1, 1964

1

3,146,597
HYDRAULIC BRAKE SYSTEM
Edward Knauss, 1072 N. Kenter Ave.,
Los Angeles 49, Calif.
Filed July 1, 1963, Ser. No. 291,901
14 Claims. (Cl. 60—54.6)

The present invention relates generally to hydraulic power systems, and more particularly to hydraulic brake systems for vehicles such as automobiles and trucks.

Hydraulic brake systems for vehicles employ, in general, a hydraulic power cylinder, known as a master cylinder, to which a foot-operated brake lever is attached for the operator's use. Hydraulic brake cylinders are mounted inside the brake drum of each wheel and have pistons which are suitably connected to move brake shoes into contact with the brake drums which rotate with the vehicle wheels. Brake shoes are normally retracted out of contact with the drums by springs, and suitable tubing interconnects the master cylinder with the brake cylinders so that the applicaton of force to the master cylinder piston will pass fluid pressure to the brake cylinders to force their pistons outwardly to apply the brake.

In such hydraulic brake systems, there is a certain amount of lost-motion or slack which must be taken up before sufficient pressure is built up in the hydraulic system to apply effective brake pressure between the brake shoes and the drum. The take-up of this lost-motion or slack requires a certain length of movement of the piston of the master cylinder which must be effected by movement of the brake lever, requiring a comparable foot travel which produces no useful result in braking the vehicle. The amount of this lost-motion foot travel also limits the lever ratio which may be used in applying brake pressure, as obviously the greater the lever ratio, the greater the foot travel which must occur to take up the lost-motion or slack in the system.

It is an object of the present invention to minimize the foot travel and movement of the brake lever which is required to take up the lost-motion and slack in a hydraulic brake system for a given lever ratio. Conversely, for the same overall foot travel, a greater lever ratio may be used in the application of brake pressure to increase braking power with less effort. It will be apparent that the system in providing quick take-up of lost-motion and slack will also compensate for brake shoe wear to a large extent.

In the system according to the present invention, the take up of slack and lost-motion in the system is preferably effected by moving the true fulcrum of the brake lever in the same direction as the master cylinder piston, in the initial movement thereof, thereby reducing the initial movement of the brake lever and of the foot pedal. This initial movement is effected at a much lower ratio, but without change in the true lever ratio of the system. When the slack has been taken up and the brake shoes are engaging the brake drum with a predetermined pressure, the true fulcrum is automatically locked against backward movement, and brake pressure is applied at the true lever ratio with a minimum of additional movement of the brake lever and foot pedal. When the foot pedal is thereafter released, the fulcrum is unlocked and moves backward with the master cylinder piston into their initial off position.

Another object of this invention is the provision of an improved hydraulic brake system employing minimum travel of a brake lever for a given lever ratio.

Another object of this invention is the provision of an improved hydraulic brake system in which the slack in the system is taken up with minimum brake lever travel by moving the true fulcrum of the brake lever with the master cylinder piston in the initial movement thereof.

A further object of this invention is the provision of an improved hydraulic brake system for vehicles which decreases the amount of brake lever and foot pedal movement for a given lever ratio of operation.

A still further object of this invention is the provision of an improved hydraulic brake system for vehicles in which initial movement of a master piston to take up slack and lost-motion is effected in a certain ratio of movement of the foot pedal lever to movement of the piston and in which the application of braking pressure is effected with a different ratio of foot travel to master piston travel to effect the braking pressure with less effort.

Yet another object of the invention is the provision of an improved hydraulic brake system for vehicles in which the ratio of master piston movement to brake lever travel is greater during the take-up of slack in the system than during the application of braking pressure thereafter, and in which the ratio of movements during the slack take-up period is adjustable.

A still further object of this invention is the provision of an improved hydraulic brake system for vehicles employing a master piston and a pivoted brake lever for effecting movement thereof, in which the true fulcrum of the brake lever is moved in a straight line, in proportion, and in the same direction as the master piston movement during take up of slack and lost-motion in the system, regardless of its amount, and is thereafter releasably locked against backward movement for the application of braking pressure.

These and other objects and features of the invention will be readily apparent to those skilled in the art from the following specification and the appended drawings, in which:

FIGURE 1 is a view, partly in elevation, partly in section, and partly diagrammatic, showing a hydraulic brake system for vehicles according to the present invention;

FIGURE 2 is an enlarged detail view of the right hand portion of FIGURE 1;

FIGURE 3 is a transverse sectional view on the line 3—3 of FIGURE 2;

FIGURE 4 is a view, partly in elevation and partly in section, of a modified form of hydraulic brake system according to the present invention;

FIGURE 5 is an enlarged view of a portion of FIGURE 4;

FIGURE 6 is a view, partly in elevation and partly in section, of a further modified form of hydraulic brake system according to the present invention;

FIGURE 7 is an enlarged view of a portion of FIGURE 6;

FIGURE 8 is a view of a portion of FIGURE 7 in a different operating position; and FIGURES 9 and 10 are detail views of parts of the system of FIGURES 6 through 8.

Referring to the embodiment of the hydraulic brake system according to the present invention illustrated in FIGURES 1 through 3, a master cylinder 11 is connected to a brake line 12 in the form of a tubing for hydraulic fluid leading to a vehicle brake system, shown schematically at 10, and including individual brake cylinders 13 for actuating the brake shoes against each of the brake drums for the individual wheels. A master operating piston 14 is disposed in the master cylinder 11 and is biased outwardly by a return spring 15. A reservoir 16 for hydraulic fluid communicates with the master cylinder 11 through a small port 17.

A brake lever 21, biased to Off position by a suitable return spring (not shown) is pivoted by a pin 22 in a yoke 23 mounted on the stud 24. The stud 24 is secured in one end of a movable bracket 25, in the other end of which is threadedly secured a piston 26. The yoke 23, bracket 25 and piston 26 are thereby rigidly secured together for straight-line axial movement to effect lineal movement of the fulcrum 22 for the brake lever 21. The end of the brake lever 21 is connected conventionally to a foot pedal 30 or other means to be engaged by the operator. A piston rod 27 engaging the master piston 14 is rigidly secured in a yoke 28 pivotally mounted by a pin 29 on the brake lever 21. The yoke 28 extends beyond the pivot pin 29 to form a split arm 31 aligned with the piston rod 27.

The bracket 25 is provided with a transverse slot 32 therethrough, through which extends an auxiliary lever 33 pivoted to the bracket 25 by a pin 34 and an enlarged opening 35 permitting limited sliding movement between the lever 33 and the pin 34. The upper end of the auxiliary lever 33 is pivotally mounted by a pin 36 on a fixed supporting bracket 37. The upper end of the lever 33 is provided with additional openings 38 and 39 which mate with cooperating openings in the supporting bracket 37 in the Off position of the parts so that the lever 33 can be adjustably pivoted on the bracket 37 at different points thereon. Such variation in the pivotal mounting of the lever 33 may be readily effected by changing the position of the pivot pin 36 and this will adjust the ratio of movements of the bracket 25 and piston rod 27.

The lower end of the lever 33 supports a pin 41 received in a keyhole slot 42 provided by opposed recesses in legs 43 and 44 forming the arm 31, the hole of the keyhole slot 42 lying toward the left as viewed in FIGURE 1. The legs 43 and 44 are adjustably biased toward each other by a spring 45 mounted on a bolt 46 extending through the legs and adjustable by a nut 47. In the Off position of FIGURE 1, the pin 41 is received in the large circular, left-hand end portion of the keyhole slot 42.

The fulcrum support and locking means is embodied in a main body member 51 pivoted by a pin 52 to a fixed supporting bracket 53. The main body member 51 has a cylinder 54 projecting forwardly therefrom receiving the piston 26 and leading to a chamber 55. The periphery of the piston 26 is grooved to receive a sealing ring 56. The chamber 55 communicates with a passageway 57 leading through the main body member 51 and in the passageway 57 is a hollow, movable control piston 58. The piston 58 is sealed to the passageway 57 by sealing rings 50 and 59, and an atmospheric port 60 is provided between the seals. The piston 58 is biased downwardly, as shown in the drawing, by a compression spring 61. A cap 62 is sealably secured on the body member 51 to close the passageway 57 and rigidly mounts to the body member a disc-like base 63 supporting a stationary valve-operating stem 64 which extends through a central passage 65 through the control piston 58. The disc 63 has a plurality of apertures 66 therethrough communicating with the control piston passage 65. The passage 65 is enlarged at the upper end of the piston 58 and 67 to receive a check valve ball 68 and a light compression spring 69 which biases the valve ball 68 toward seating position at the junction of the passages 65 and 67. The spring 69 is maintained in position by a releasable snap ring 71. A hydraulic fluid line 72 interconnects the brake line 12 with the interior of the cap 62.

The operation of the embodiment of the invention shown in FIGURES 1 through 3 will now be described: The parts are shown in full lines in FIGURE 1 in the Off position, with the brakes released and no working pressure within the lines 12 and 72. Initial movement of the foot pedal or other operator 30 effects shifting movement of the brake lever 21 toward the left, as viewed in FIGURE 1, into the broken line position. During this initial brake movement, the fulcrum 22 for the brake lever moves in a substantially straight line with the master piston rod 27. The piston 26, which is rigidly connected to the pivot pin 22 forming the fulcrum of the brake lever 21, likewise moves toward the left outwardly of the cylinder 54 in the position shown in broken lines in FIGURE 1 and in full lines in FIGURE 2. In this movement the yoke 23, the bracket 25, the yoke 28, the arm 31 and the pin 41 all travel as a unit bodily toward the left, with the auxiliary lever 33 pivoting about its mounting 36.

The movement of the master piston 14 first seals off the port 17 and then builds up pressure in the brake line 12 which is fed back through the control line 72 into the end cap 62. The increase in brake-line pressure acts on the brake cylinders to move the brake shoes against the drum and the hydraulic fluid flows through passages 65 and 67 to maintain the chamber 55 filled as the piston 26 moves outwardly of the cylinder 54. When the brake line pressure reaches a predetermined value, determined by the force of spring 61, the piston 58 will move upwardly into the position shown in FIGURE 2. An example only of this pressure would be 60 p.s.i. where the main system will cause brake shoe drag at about 100 p.s.i.

As seen in FIGURE 1, with the piston 58 in its lower position, the valve ball 68 is unseated by the stem 64 extending up through the opening 65 in the piston 58. When the brake line pressure reaches the predetermined value, approximately 60 p.s.i. in the example given, the piston 58 will move upwardly into the position of FIGURE 2 to free the valve ball 68 to be biased into its seat by the light spring 69. However, as the piston 26 continues to move outwardly, the brake fluid is free to move upwardly by unseating the ball 68 against the light bias of spring 69 to continue to fill the chamber 55 behind the piston.

In the example given, the brake shoes in the system will be exerting a drag upon the drums and all slack and lost-motion will be taken up when the brake line pressure reaches approximately 100 p.s.i. The spring 45 is adjusted so that at this point it permits the legs 43 and 44 of the split arm 31 to be separated and the pin 41 to enter the smaller portion of the keyhole slot 42 as the arm 31 and piston rod 27 continue moving to the left, as shown in the drawing, with the fulcrum pin 22 remaining stationary. The fulcrum pin 22 now becomes a true fulcrum with further movement of the brake lever 21 causing its rotation about the fulcrum pin 22 to apply braking pressure to the master piston 14 with a lever ratio determined by the spacing between pins 22 and 29 and between pin 22 and the brake pedal 30.

In this braking action, the fulcrum pin 22 is prevented from moving backwardly and is locked in its forward position by piston 26 being prevented from moving into the cylinder 54, the check valve ball 68 being seated to close the opening through the control piston 58. The piston 26, bracket 25, and fulcrum pin 22 are therefore locked in forward position while the brake lever 21 pivots about the pin 22 to move the piston rod 27 and master piston that short distance to the left which is required to build up the requisite braking pressure, this movement being now quite small since the slack and lost-motion were taken up by the lineal movement of the fulcrum. In the pivoting of the braking lever 21 about the fulcrum pin 22, the arm 31 moves with the lever 21 and the piston rod 27, and the legs 43, 44 are spread apart by the entrance of the pin 41 into the narrow, right-hand portion of the keyhole slot 42, the lever 33 and the pin 41 being held stationary with the bracket 25.

As the master piston 14 makes its working stroke, the return spring 15 is compressed and when the force on the brake pedal 30 is released, the force on the piston exerted by the hydraulic fluid and the return spring moves the piston 14 and the piston rod 27 backwardly to the right. The initial backward movement moves arm 31 and keyhole slot 42 relative to the pin 41 to return the pin into the large circular, left-hand end of the slot 42, as shown in FIGURE 1. When the brake-line pressure decreases to about 60 p.s.i. in the example given, the control piston 58 will move downwardly under the bias of spring 61 from the position of FIGURE 2 into the full line position of FIGURE 1, whereupon the stem 64 will unseat the valve ball 68 and the fluid in chamber 55 will be free to return through passages 67, 65 and apertures 66 to the line 72 and the master cylinder. The piston 26 is therefore free to move toward the right into the cylinder 54, which it does under the action of the master piston return spring and the return spring for the brake lever 21.

All the parts are thereby returned to their normal Off position and the pressure in brake-line 12 is released to release the braking effect at the vehicle wheels, the brake shoes being conventionally moved away from the brake drums by their individual biasing springs.

It will therefore be seen that the initial take-up of slack and lost-motion in the hydraulic system by movement of the master piston is accomplished with lineal movement of the true fulcrum of the brake lever and is independent of the lever ratio. The fulcrum movement is preferably in a straight line and in direct proportion to the movement of the master piston, and, being independent of the true brake lever ratio, is effected quickly and with a minimum movement of the brake lever and operating pedal. Movement of the brake lever and operating pedal in applying the vehicle brakes after the slack has been taken up will be quite small so that overall pedal and brake lever movement is greatly reduced.

Conversely, for the same brake pedal travel as in conventional system, it will be seen that a much larger brake lever ratio may be used to secure greater power with less effort, since the slack and lost-motion take-up pedal movement is short and independent of the lever ratio for the system.

In either case, the movement of the true fulcrum to take up slack and lost-motion in the system readily compensates for brake shoe wear with minimum movement of the operating pedal and brake lever.

Referring now to the modification of the present invention shown in FIGURES 4 and 5, the master cylinder 11 is connected to the brake line 12 and a brake system 10, as in FIGURE 1. The piston rod 27 for the master piston is now connected to one end of a double-ended bracket 81 which is pivotally mounted by a pin 82 on the brake lever 21. To the opposite end of the bracket 81 is mounted a piston rod 83 carrying a piston 84 on its end which is reciprocable within a cylinder 85. One end of the cylinder 85 is open to atmosphere at 86 and the other end is connected to a hydraulic tube 87. The piston 84 is sealed in the cylinder 85 by a ring 88, and the rod 83 is sealed within the opening into the cylinder 85 by a sealing ring 89. The cylinder 85 is pivotally mounted by a pin 91 to a fixed bracket 92.

The true fulcrum for the brake lever 21 is provided by a pin 93 which pivotally connects the lever 21 to a yoke 94. The yoke 94 is mounted on a piston rod 95 carrying a piston 96 within a cylinder 97, the piston 96 being sealed within the cylinder 97 by a ring 98. A dust shield 99 surrounds the entrance into the cylinder 97. The cylinder 97 has an inner wall 101 provided with a central opening 102 therethrough. A control member 103 is pivotally mounted by a pin 104 to a fixed bracket 105 and has the cylinder 97 sealably mounted thereon at 106.

The control member 103 has a multi-diameter central bore 107 in which is disposed an elongated plunger-piston 108 having a head 109 thereon and sealed at 110 and 111 at opposite sides of an atmospheric opening 120. A central passage 112 extends through the plunger-piston 108. A sealing ring 113 mounted on the stem end of the plunger-piston 108 is adapted to engage the wall 101 about the opening 102 in sealing relation, as shown in FIGURE 5. A spring 114 biases the plunger-piston 108 toward the right as illustrated, into the position shown in FIGURE 4. The bore 107 communicates through the hydraulic tubing 87 with the cylinder 85.

On the control member 103 is mounted a fluid cup 115, as by an end cap 116 sealably mounting the cup 115 and screwed into the body of the member 103 with an opening 117 through the cap communicating with the bore 107 in the control member. The cup 115 has a bottom wall 118 with a central opening 119 therethrough closable by a sealing annulus of rubber, or like material, 121, engageable with the wall 118 at the under surface thereof. The sealing annulus 121 is mounted on a metallic supporting annulus 122 which is guided on a cylindrical hub 123 extending upwardly from the end cap 116. The interior opening through the sealing annulus 121 is adapted to be closed by a top disc 124 having a stem 125 extending through the central openings in the annuli 121 and 122 and biased downwardly relative to the annuli by a spring 126. The disc 124 seals to the annulus 121 at two diameters, one at a peripheral flange 127 and the other at the smaller diameter of the annulus 128. The cup 115 contains a supply of control hydraulic liquid at 129 and is closed by a top cover plate 130.

The operation of the modification illustrated in FIGURES 4 and 5 is as follows: Upon initial movement of the brake lever 21, the slack and lost-motion in the hydraulic system is first taken up by movement bodily to the left of the true fulcrum 93 for the brake lever. This lineal movement of the fulcrum pin 93 is effected in the following manner: The piston rod 83 and the piston 84 move positively with the brake lever 21, being connected thereto by the pin 82. Fluid to the left of piston 84 therefore moves through the tubing 87 into the bore 107 and through the opening 102 into the cylinder 97 where it acts against piston 96 to move piston 96, piston rod 95, yoke 94 and fulcrum pin 93 bodily and lineally to the left as shown in FIGURE 4. The check valve provided by the sealing annulus 121 against the cup wall 118 closes immediately there is any pressure within the bore 107 to be communicated to the underside of the annulus 122 through the cap passage 117. The fulcrum pin 93 moves forwardly in direct proportion to the movement of the master piston, the ratio of movements of the fulcrum and piston being determined by the areas of the pistons 96 and 84.

As in the previous example, the lineal movement of the fulcrum pin 93 is set to continue until all the slack in the hydraulic system has been taken up and the brake shoes are dragging against the brake drums, this being accomplished with a pressure of approximately 100 p.s.i. in the brake line. At this point the pressure behind the piston 96 acts through passage 112 to the head 109 of plunger-piston 108 to move it to the left, as shown in FIGURE 5, so that opening 102 is sealed by the ring 113 mounted at the stem end of the plunger-piston 108. The fulcrum pin 93 now becomes locked in position and becomes a true fulcrum for rotation of the brake lever 21 thereabout to move the master piston to effect full braking pressure. Movement of the master piston rod 27 of necessity effects movement of the piston 84 to transfer more fluid from the cylinder 85 through the tubing 87. Since the opening 102 is closed, pressure builds up within the bore 107 until the force exerted on the smaller sealing area of the disc 124, within the inner diameter of the annulus 121, is sufficient to overcome the bias of spring 126, whereupon the disc 124 moves upwardly to uncover the openings through the annuli 121, 122. As soon as the seal of the inner edge of the annulus 121 is uncovered the entire area of the disc 124 is subjected to the pressure within bore 107 so that the disc 124 is held open by a much smaller pressure and therefore the piston 84 works against only a very slight back pressure, only sufficient when applied to the entire area of the under surface of the disc 124 to keep it opened against the bias of the relatively light spring 126. Liquid from the cylinder 85 behind the piston 84 thereafter freely passes through tubing 87, bore 107, passage 117, into the cup 115 to add to the liquid 127 therein.

While braking pressure is being applied in the braking system, the fulcrum 93 will remain locked in position, since the piston 96 cannot move backwardly because the opening 102 is sealed by the sealing ring 113 on the stem of the plunger-piston 108. Force exerted on the piston 96 by the fulcrum is transmitted from the cylinder 97 through the bore or passage 112 into the space behind the head 109 on the piston-plunger and acts to maintain the seal about the opening 102. Therefore, the piston 96 and the fulcrum 93 are locked securely in position, while the piston 84 and the master piston rod 27 are free to move in the normal brake application as the brake lever 21 pivots about the true fulcrum 93.

When the brake pedal is released, the pressure exerted on the liquid in cylinder 97 by the piston 96 is released and drops down to the point where the spring 114 overcomes the force on the head 109 of the plunger-piston 108, whereupon the plunger-piston moves to the right into the position shown in FIGURE 4. This uncovers the opening 102 and permits free interchange of liquid between the cylinders 97 and 85. Accordingly, the pistons 96 and 84 move rearwardly under the action of the master cylinder return spring 15, and the return spring for the brake lever to return the parts to their initial Off position, as shown in FIGURE 4. With the end of over-pressure in the bore 107, the check valve provided by the combined annuli 121, 122 is free to drop open under the action of gravity to insure that the hydraulic control system is full of liquid when in the unoperated Off position.

It is therefore seen that the embodiment of FIGURES 4 and 5 also provides for the quick take-up of the slack in the hydraulic system by moving the true fulcrum 93 lineally, in a straight line and in direct proportion to the movement of the master piston rod 27. This movement is independent of the true lever ratio and is accomplished with a minimum of foot pedal travel. After the slack has been taken up and the brake shoes are dragging against the brake drums, the true fulcrum 93 becomes locked in position and thereafter any desired pressure may be placed in the braking system with only minimum movement of the foot pedal and the brake lever 21. Again, the system may provide for the application of full braking pressure with a decreased foot pedal movement, while using the same lever ratio, or, conversely, using the same foot pedal travel, a greater lever ratio is permitted to secure greater power with less effort. In both cases the desired result is secured by effecting movement of the true fulcrum independently of the lever ratio to take up the slack and lot-motion in the system.

A further modification of the present invention is illustrated in FIGURES 6 through 10 which show a mechanical arrangement for taking up the slack and removing lost-motion from a hydraulic brake system. This is done, as in the previous embodiments, by effecting lineal, straight-line movement of the true fulcrum of the brake lever in direct proportion to the movement of the master piston rod and independently of the lever ratio. In this embodiment, the master cylinder 11 and brake line 12 are to be connected to a hydraulic brake system 10 as in FIGURE 1. The master piston rod 27 is mounted to a first socket member 135 pivotally mounted by a pin 136 to the brake lever 21. The true fulcrum for the brake lever 21 is provided by a pin 137 at the end of a rod 138 mounted on a second socket member 139 which is pivotally connected intermediate the ends of an auxiliary lever 141, the lever 141 being pivotally mounted at its upper end at 142 to a fixed bracket 143. The mounting 142 may be adjustable similarly to that at 56 in FIGURE 1. The second socket member 139 is connected to the lever 141 by a pin 144 and enlarged clearance hole 145 receiving the same.

Socket member 139 has a bore 146 in the end thereof opposite the fulcrum pin mounting which receives a plunger 147 pivoted at 148 to a fixed bracket 149. The member 139 has an integral arm 151 depending therefrom in which is rotatably mounted a shaft 152 having an arm 153 integral therewith and which carries a latch member 154 adjustable thereon. The latch member 154 has a projecting finger 155 with a serrated end 156 adapted to engage in latching relation serrations 157 on the underside of the plunger 147.

The socket member 135 has a bore 161 in the end opposite the mounting of the master piston rod in which is received a plunger 162. The undersurface of the plunger 162 has a recess 163 into which projects a plunger 164 biased upwardly by a spring 165 within a bore 166 communicating with and at right angles to the bore 161. An indexing ball 167 is received within complementary hemispherical sockets in the top surface of the plunger 164 and in the bottom surface defining the recess 163 in the plunger 162. The tension on spring 165 is adjustable by means of a screw 168 bearing thereon.

A bracket 169 is secured to the end of the plunger 162 and has a slot 171 in its opposite arms in which is disposed a cross pin 172. The lever 141 has a toe 173 at its bottom end and an inclined, elongated slot 174 therein through which the pin 172 also extends, the toe 173 being disposed between the arms of the bracket 169. A roller 175 is mounted on the pin 172 in position to engage the undersurface of the arm 153 to effect movement thereof in a clockwise direction into unlatching position, as shown in FIGURE 8.

The operation of the embodiment of the invention illustrated in FIGURES 6 through 10 will now be described: The operation of the foot pedal and brake lever 21 results in initial straight-line movement of both the true fulcrum 137 and the master piston rod 27, in substantially the same manner as in the two embodiments of the invention previously described. As the fulcrum 137 moves lineally to the left, as viewed in FIGURE 6, the socket member 139 will move away from the plunger 147 into the position shown in FIGURE 7, and this will continue until the brake shoes engage the brake drums with the slack removed from the hydraulic brake system. The point at which the lineal movement of the true fulcrum ceases will be determined by the tension on spring 165, and if set, as before, for a brake line pressure of substantially 100 p.s.i., the connection between the socket member 135 and the plunger 162 will be separated at this point.

The fulcrum 137 is prevented from moving backwardly by the latching of the serrated end 156 of the finger 155 with the serrations 157 on the plunger 147 which thereby locks the socket member 139 and the true fulcrum 137 in forward position. As the brake pedal and brake lever 21 are moved to effect full braking action, the socket member 135 moves forwardly relative to the plunger 162 which is held stationary the plunger 164 being forced downwardly against the bias of spring 165 as the ball 167 leaves a socket in which it is normally received. The operation of this modification in applying braking pressure is therefore substantially similar to that of the two previous embodiments, in that the true fulcrum 137 moves bodily lineally in proportion to the movement of the master piston rod 27 to take up the slack in the hydraulic system. After the slack has been removed, the true fulcrum becomes locked for pivotal motion of the brake lever thereabout and the application of force to the master piston at the lever ratio previously determined.

Upon release of the brake pedal, the master cylinder return spring 15 moves the socket member 135 toward the right relative to the plunger 162 until the ball 167 is again received in the complementary sockets in the plungers 162 and 164 in the position of FIGURE 7. Continued movement of the socket member 135 to the right by the master cylinder return spring moves the plunger 162 and yoke 169 therewith to move the pin 172. The inclined bottom surface of the slot 173 moves the pin 172, and roller 175 therewith, upwardly into the position of FIGURE 8 where the roller 175 engages the arm 153 and rotates it, shaft 152, latching member 154 and finger 155 in a clockwise direction into unlatching position, whereupon the socket member 139 moves to the right over the plunger 147. The lever 141 rotates counterclockwise about its pivotal mounting 142 in this final movement to return the parts into Off position of FIGURE 6, with the brakes released and the parts in a position for a new application of braking pressure to the system.

It will be seen that according to the present invention, the system provides either for a shorter travel of the brake pedal and brake lever for a given lever ratio, or for a greater lever ratio with the same brake pedal travel, by effecting quick take-up of the slack or lost-motion in the hydraulic brake system. This slack take up is effected by moving the true fulcrum of the brake lever bodily upon initial movement of the brake lever. This movement of the true fulcrum is preferably effected in a straight line, in direct proportion to the movement of the master piston, and independently of the lever ratio with which braking pressure is ultimately applied. The brake-line pressure at which fulcrum movement stops may be readily changed by changing the tension of the spring 45 in the first embodiment of the invention, of the spring 114 in the second embodiment of the invention, and of the spring 165 in the third embodiment of the invention. The ratio between the movements of the brake lever fulcrum and the master piston may also be varied, for example by changing the pivot pin 36 of the first embodiment and by changing the relative areas of the pistons 96 and 84 of the second embodiment. The brake lever ratio may be changed by varying the relative distance between the points of attachment of the master piston rod and of the brake pedal to the brake lever, with respect to the true fulcrum point thereof.

While certain preferred embodiments of the invention have been specifically illustrated and described, it is understood that the invention is not limited thereto as many variations will be apparent to those skilled in the art, and the invention is to be given its broadest interpretation within the terms of the following claims.

I claim:

1. In a hydraulic brake system for vehicles including a master cylinder for translating mechanical force into hydraulic brake-line pressure and brake cylinders for translating the brake-line pressure into braking force: a master piston in said master cylinder; a braking lever for applying mechanical force to said master piston; a fulcrum for said braking lever; means for moving said fulcrum bodily with said master piston upon initial movement of said braking lever to take up the slack in the brake system; and means for thereafter locking said fulcrum against return movement whereby said braking lever pivots about said fulcrum to exert braking force on said master piston.

2. In a hydraulic brake system for vehicles including a master cylinder for translating mechanical force into hydraulic brake-line pressure and brake cylinders for translating brake-line pressure into braking force: a master piston in said master cylinder the amount of whose movement determines the magnitude of hydraulic pressure in the system; a braking lever having a pivotal mounting and a connection to said master piston; means for effecting concurrent movement bodily of both said pivotal mounting and said master piston upon initial movement of said brake lever until a predetermined pressure is built up in the braking system; and means for thereafter locking said pivotal mounting against return movement while the braking lever pivots thereabout to effect further movement of the master piston without corresponding movement of the pivotal mounting to effect the braking action.

3. In a hydraulic brake system for vehicles including a master cylinder for translating mechanical force into hydraulic pressure in a brake-line and brake cylinders for translating the brake-line hydraulic pressure into braking force: a master piston in said master cylinder; a braking lever for applying mechanical force to said master piston; a fulcrum for said braking lever; means for moving said fulcrum bodily with said master piston upon initial movement of said braking lever to take up the slack in the brake system; means for thereafter locking said fulcrum against return movement, whereby said braking lever pivots about said fulcrum to exert braking force on said master piston; and means responsive to release of the mechanical force on said braking lever for releasing said fulcrum for return movement with the master piston to its initial position.

4. In a hydraulic brake system for vehicles including a master cylinder for translating mechanical pressure into hydraulic brake-line pressure and brake cylinders for translating brake-line pressure into braking force: a master piston in said master cylinder; a return spring biasing said master piston to its unoperated position; a braking lever for applying mechanical force to said master piston; a fulcrum for said braking lever; means mounting said fulcrum for movement in a substantially straight line parallel to the line of movement of said master piston; means connecting said braking lever to said master piston; means for effecting movement of both said fulcrum and said master piston upon initial movement of said braking lever to take up the slack and lost-motion in the hydraulic brake system; and means for thereafter locking said fulcrum in position against return movement whereby continued movement of said braking lever effects rotation thereof about said fulcrum to effect movement of the master piston alone to perform the braking action.

5. In a hydraulic brake system for vehicles including a master cylinder for translating mechanical pressure into hydraulic brake-line pressure and brake cylinders for translating brake-line pressure into braking force: a master piston in said master cylinder; a return spring biasing said master piston to its unoperated position; a braking lever for applying mechanical force to said master piston; a fulcrum for said braking lever; means mounting said fulcrum for movement in a substantially straight line parallel to the line of movement of said master piston; means connecting said braking lever to said master piston; means for effecting movement of both said fulcrum and said master piston upon initial movement of said braking lever to take up the slack and lost-motion in the hydraulic brake system; means for thereafter locking said fulcrum in position against return movement whereby continued movement of said braking lever effects rotation thereof about said fulcrum to effect movement of the master piston alone to perform the braking action; and means responsive to release of force on said braking lever for releasing said fulcrum for return movement to its initial position, whereupon said master piston and fulcrum move together back to their initial position under the action at least in part of said master piston return spring.

6. In a hydraulic brake system for vehicles including a master cylinder for translating mechanical pressure into hydraulic brake-line pressure and brake cylinders for translating brake-line pressure into braking force: a master piston in said master cylinder; a return spring biasing said master piston to its unoperated position; a braking lever for applying mechanical force to said master piston; a fulcrum for said braking lever; means mounting said fulcrum for movement in a substantially straight line parallel to the line of movement of said master piston; means connecting said braking lever to said master piston; means for effecting movement of both said fulcrum and said master piston upon initial movement of said braking lever until a predetermined brake-line pressure has been reached; a piston connected to move with said fulcrum; hydraulic fluid behind said fulcrum piston, the pressure of which prevents return movement of the piston and fulcrum while said braking system pressure remains above a predetermined value, said braking lever thereafter pivoting about said fulcrum to apply braking force to said master piston; and means whereby release of force on said braking lever and reduction in the brake-line pressure in the system effects release of the pressure of the hydraulic fluid behind said fulcrum piston so that the fulcrum and master cylinder return together to their initial positions.

7. In a hydraulic brake system for vehicles including a master cylinder for translating mechanical pressure into hydraulic brake-line pressure and brake cylinders for translating brake-line pressure into braking force: a braking piston in said master cylinder; a return spring biasing said master piston to its unoperated position; a braking lever for applying mechanical force to said master piston; a fulcrum for said braking lever; means mounting said fulcrum for movement in a substantially straight line parallel to the line of movement of said master piston; means connecting said braking lever to said master piston; means for effecting movement of both said fulcrum and said master piston upon initial movement of said braking lever until a predetermined brake-line pressure has been reached; a piston connected to move with said fulcrum; hydraulic fluid behind said fulcrum piston, the pressure of which locks the piston and fulcrum against return movement while said braking system pressure remains above a predetermined value; and a lost-motion connection between said fulcrum and said braking lever, spaced from the fulcrum and operating without lost-motion to effect the movement bodily of the fulcrum with the master piston upon initial movement of the braking lever, said lost-motion connection being operative when the fulcrum is locked to provide for pivotal movement of the braking lever about the fulcrum while the fulcrum remains stationary.

8. In a hydraulic brake system for vehicles including a master cylinder for translating mechanical force into hydraulic brake-line pressure and braking cylinders for translating brake-line pressure into braking force: a master piston in said master cylinder whose movement establishes the brake-line pressure; a return spring biasing said master piston into its unoperated position; a braking lever; a pivotal mounting for said braking lever mounted on an auxiliary piston for movement bodily therewith; means connecting said braking lever to said master piston; a lost-motion connection connecting said braking lever at a point remote from its pivotal mounting with a point between said pivotal mounting and said auxiliary piston for effecting movement bodily of said pivotal mounting with the master piston upon initial movement of said braking lever until a predetermined brake-line pressure is built up; and means feeding brake-line fluid behind said auxiliary piston and responsive to a predetermined brake-line pressure to seal the fluid behind said auxiliary piston against return movement so as to lock the piston against such return movement, said lost-motion connection after attainment of said first predetermined brake-line pressure permitting rotation of said braking lever about its pivotal mounting while the pivotal mounting remains stationary to apply braking movement to the master piston.

9. In a hydraulic braking system for vehicles including a master cylinder for translating mechanical force into hydraulic brake-line pressure and braking cylinders for translating brake-line pressure into braking force: a master piston in said master cylinder whose movement establishes the brake-line pressure; a return spring biasing said master piston into its unoperated position; a braking lever; a pivotal mounting for said braking lever mounted on a first auxiliary piston for movement bodily therewith; means connecting said braking lever to said master piston; a second auxiliary piston connected to said braking lever at a point remote from its pivotal mounting; cylinders for said auxiliary pistons having fluid therein; means interconnecting the cylinders of said auxiliary pistons to effect transfer of fluid therebetween to effect movement of the pivotal mounting bodily in a substantially straight line in response to initial movement of the braking lever and master piston to establish an initial predetermined brake-line pressure; means for sealing the fluid passage to the cylinder for said first auxiliary piston at the attainment of said initial brake-line pressure to prevent return movement of the pivotal mounting, said braking lever thereafter pivoting about its pivotal mounting to effect braking movement of the master piston; and means providing a by-pass for the fluid behind said second auxiliary piston to permit free movement of the braking lever and master piston in performing the braking action.

10. In a hydraulic brake system for vehicles including a master cylinder for translating mechanical force into hydraulic brake-line pressure and braking cylinders for translating brake-line pressure into braking force: a master piston in said master cylinder whose movement establishes the brake-line pressure; a return spring biasing said master piston into its unoperated position; a braking lever; a pivotal mounting for said braking lever mounted on an auxiliary piston for movement bodily therewith; means connecting said braking lever to said master piston; a lost-motion connection connecting said braking lever at a point remote from its pivotal mounting with a point between said pivotal mounting and said auxiliary piston for effecting movement bodily of said pivotal mounting with the master piston upon initial movement of said braking lever until a predetermined brake-line pressure is built up; means feeding brake-line fluid behind said auxiliary piston and responsive to a predetermined brake-line pressure to seal the fluid behind said auxiliary piston against return movement so as to lock the piston against such return movement, said lost-motion connection after attainment of said first predetermined brake-line pressure permitting rotation of said braking lever about its pivotal mounting while the pivotal mounting remains stationary to apply braking movement to the master piston; and means responsive to release of the force on said braking lever for releasing the seal on the fluid behind said auxiliary piston to permit return movement of the braking lever pivotal mounting with the master piston to their initial, unoperated positions.

11. In a hydraulic braking system for vehicles including a master cylinder for translating mechanical force into hydraulic brake-line pressure and braking cylinders for translating brake-line pressure into braking force: a master piston in said master cylinder whose movement establishes the brake-line pressure; a return spring biasing said master piston into its unoperated position; a braking lever; a pivotal mounting for said braking lever mounted on a first auxiliary piston for movement bodily therewith; means connecting said braking lever to said master piston; a second auxiliary piston connected to said braking lever at a point remote from its pivotal mounting; cylinders for said auxiliary pistons having fluid therein; means interconnecting the cylinders of said auxiliary pistons to effect transfer of fluid therebetween to effect movement of the pivotal mounting bodily in substantially a straight line in response to initial movement of the braking lever and master piston to establish an initial predetermined brake-line pressure; means for sealing the fluid passage to the cylinder for said first auxiliary piston at the attainment of said initial brake-line pressure to prevent return movement of the pivotal mounting, said braking lever thereafter pivoting about its pivotal mounting to effect braking movement of the master piston; means providing a by-pass for the fluid behind said second auxiliary piston to permit free movement of the braking lever and master piston in performing the braking action; and means responsive to release of the force on said braking lever for opening the fluid passage to the cylinder of said first auxiliary piston to permit return movement of the braking lever pivotal mounting with the master piston to their initial, unoperated positions.

12. In a hydraulic brake system for vehicles including a master cylinder for translating mechanical force into hydraulic brake-line pressure and braking cylinders for translating brake-line pressure into braking force: a master piston in said master cylinder; a braking lever connected to said master piston; a fulcrum mounting said braking lever and about which it rotates to effect the braking action; a first pair of relatively movable members mounting said fulcrum for movement bodily in a direction substantially parallel to the movement of the master piston; a second pair of relatively movable members interconnecting the braking lever and said first pair of relatively movable members; and means for effecting relative movement between said first pair of relatively movable members upon initial movement of said braking lever to effect movement of said fulcrum bodily in the same direction as said master piston to take up the slack in the system and establish an initial predetermined pressure therein, said first pair of relatively movable members being locked in their extended position to prevent return movement of said fulcrum, continued movement of said braking lever thereafter to perform the braking action effecting relative movement between said second pair of relatively movable members while the braking lever pivots about the now stationary fulcrum to move the master piston only.

13. In a hydraulic brake system for vehicles including a master cylinder for translating mechanical force into hydraulic brake-line pressure and braking cylinders for translating brake-line pressure into braking force: a master piston in said master cylinder; a braking lever connected to said master piston; a fulcrum mounting said braking lever and about which it rotates to effect the braking action; a first pair of relatively movable members mounting said fulcrum for movement bodily in a direction substantially parallel to the movement of the master piston; a second pair of relatively movable members interconnecting the braking lever and said first pair of relatively movable members; means for effecting relative movement between said first pair of relatively movable members upon initial movement of said braking lever to effect movement of said fulcrum bodily in the same direction as said master piston to take up the slack in the system and establish an initial predetermined pressure therein, said first pair of relatively movable members being locked in their extended position to prevent return movement of said fulcrum, continued movement of said braking lever thereafter to perform the braking action effecting relative movement between said second pair of relatively movable members while the braking lever pivots about the now stationary fulcrum to move the master piston only; and means biasing the parts for return to their initial positions; release of the force on said braking lever first returning said second pair of relatively movable members to their initially indexed position and thereafter unlocking said first pair of relatively movable members for return under the action of said biasing means to the initial position of the fulcrum.

14. In a hydraulic brake system for vehicles including a master cylinder for translating mechanical force into hydraulic brake-line pressure and braking cylinders for translating brake-line pressure into braking force: a master piston in said master cylinder; a braking lever connected to said master piston; a fulcrum mounting said braking lever and about which it rotates to effect the braking action; a first pair of relatively movable members mounting said fulcrum for movement bodily in a direction substantially parallel to the movement of the master piston; a second pair of relatively movable members interconnecting the braking lever and said first pair of relatively movable members; means for effecting relative movement between said first pair of relatively movable members upon initial movement of said braking lever to effect movement of said fulcrum bodily in the same direction as said master piston to take up the slack in the system and establish an initial predetermined pressure therein; automatically operated latch means for locking said first pair of relatively movable members in their extended position to prevent return movement of said fulcrum, continued movement of said braking lever thereafter to perform the braking action effecting relative movement between said second pair of relatively movable members while the braking lever pivots about the now stationary fulcrum to move the master piston only; means biasing the parts for return to initial position, release of the force on said braking lever first returning said second pair of relatively movable members to their initally indexed position and moving them together thereafter; and means actuated by the return movement of said second pair of relatively movable members for engaging and releasing said latch means to permit said first pair of separable members to contract under the action of said biasing means to return the fulcrum to its initial position.

References Cited in the file of this patent
UNITED STATES PATENTS

| | | |
|---|---|---|
| 1,800,036 | Wieczorek | Apr. 7, 1931 |
| 1,940,822 | Shinn | Dec. 26, 1933 |

FOREIGN PATENTS

| | | |
|---|---|---|
| 759,202 | France | Nov. 16, 1933 |